(12) United States Patent
Miller et al.

(10) Patent No.: US 10,831,947 B1
(45) Date of Patent: Nov. 10, 2020

(54) SYSTEM AND METHOD FOR OPTIMIZING DESIGN OF AIRCRAFT BACKPLANE SPATIAL SEPARATION

(71) Applicant: Rockwell Collins, Inc., Cedar Rapids, IA (US)

(72) Inventors: David A. Miller, Swisher, IA (US); Richard M. Bradford, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 420 days.

(21) Appl. No.: 15/619,267

(22) Filed: Jun. 9, 2017

(51) Int. Cl.
| | |
|---|---|
| *G06F 30/15* | (2020.01) |
| *H04L 29/08* | (2006.01) |
| *H04L 12/24* | (2006.01) |
| *H04L 12/947* | (2013.01) |
| *H04Q 9/00* | (2006.01) |
| *G06Q 10/06* | (2012.01) |

(52) U.S. Cl.
CPC ....... *G06F 30/15* (2020.01); *G06Q 10/06313* (2013.01); *H04L 41/08* (2013.01); *H04L 49/25* (2013.01); *H04L 67/12* (2013.01); *H04Q 9/00* (2013.01)

(58) Field of Classification Search
CPC .......... G06F 17/5095; G06Q 10/06313; H04Q 9/00; H04L 41/08; H04L 67/12; H04L 49/25
See application file for complete search history.

(56) References Cited

U.S. PATENT DOCUMENTS

| | | | |
|---|---|---|---|
| 5,778,203 | A | 7/1998 | Birkedahl et al. |
| 5,796,185 | A | 8/1998 | Takata et al. |
| 6,801,769 | B1 | 10/2004 | Royalty |
| 7,421,526 | B2 | 9/2008 | Fletcher et al. |
| 7,756,145 | B2 | 7/2010 | Kettering et al. |

(Continued)

OTHER PUBLICATIONS

Bjorn Annighofer et al., "Automated Selection, Sizing, and Mapping of Integrated Modular Avionics Modules," 32nd Digital Avionics Systems Conference (Year: 2013).*

(Continued)

*Primary Examiner* — Rehana Perveen
*Assistant Examiner* — Steven W Crabb
(74) *Attorney, Agent, or Firm* — Suiter Swantz pc llo

(57) ABSTRACT

A method for optimizing the design of backplane and field bus routing for avionics network architectures determines a solution space of valid configurations defined by the intersection of universes corresponding to potential aircraft sensor locations, the data content relationships for each hosted application executing on the aircraft computing center, potential remote data concentrator (RDC) configurations, and potential backplane/field bus configurations for the avionics network architecture. The method includes identifying within the solution space, via an optimization engine, optimal configuration solutions of a desired optimality level based on connectivity constraints, system survivability constraints providing spatial separation of primary and redundant sensor and data collection systems, system robustness constraints associated with minimum functional capabilities for continued safe flight and landing capability, and an objective function characterizing overall desirability.

5 Claims, 5 Drawing Sheets

(56) References Cited

U.S. PATENT DOCUMENTS

| | | | |
|---|---|---|---|
| 8,078,055 B1 | 12/2011 | Mazuk et al. | |
| 8,391,788 B1 | 3/2013 | Mazuk et al. | |
| 8,423,331 B2 | 4/2013 | Minot | |
| 8,683,105 B1 | 3/2014 | Shultz et al. | |
| 8,996,735 B2 | 3/2015 | Todd et al. | |
| 9,137,038 B1 | 9/2015 | Mazuk et al. | |
| 2010/0292969 A1* | 11/2010 | Minot | G06F 17/50 703/2 |

OTHER PUBLICATIONS

P. Bieber et al., "Constraint-based Design of Avionics Platform—Preliminary Design Exploration," pp. 1-7 (Year: 2007).*

Chao Zhang et al., "Modeling and Optimization in Distributed Integrated Modular Avionics," IEEE 32nd Digital Avionics Systems Conference, pp. 2E1-1-2E1-12 (Year: 2013).*

Bjorn Annighofer et al., "Multi-Objective Mapping Optimization for Distributed Integrated Modular Avionics," IEEE/AIAA 31st Digital Avionics Systems Conference, pp. 6B2-1-6B2-13 (Year: 2012).*

Bjorn Annighofer et al., "Automated Selection, Sizing, and Mapping of Integrated Modular Avionics Modules," 32nd Digital Avionics Systems Conference, IEEE pp. 2E2-1 to 2E2-15 (Year: 2013).*

Kosta Varnavas, Serial Back-Plane Technologies in Advanced Avionics Architectures, Digital Avionics System Conference (DASC 2005), Dec. 27, 2005, IEEE, 25 pages.

Section 25.365 Pressurized compartment loads, Code of Federal Regulations, Title 14 Aeronautics and Space, Jan. 1, 2011 edition, pp. 404-405, U.S. Government Publishing Office, US.

Federal Aviation Administration, U.S. Department of Transportation, Advisory Circular, Survivability of Systems, AC No. 25.795-7, Oct. 24, 2008, 5 pages.

* cited by examiner

210 — Determining, via at least one optimization engine, at least one solution space based on the first plurality of sensor locations, the second plurality of data content relationships, the third plurality of RDC configurations, and the fourth plurality of switch configurations, the at least one solution space associated with a fifth plurality of configuration solutions corresponding to the aircraft, each configuration solution comprising:
- a sixth plurality of selected sensor locations;
- a seventh plurality of selected RDC configurations;
- an eighth plurality of selected switch configurations, and
- a ninth plurality of selected network links connecting the at least one aircraft sensor to the at least one computing center via the at least one network link 212 — Determining, via the at least one optimization engine, one or more optimal configuration solutions within the fifth plurality of configuration solutions based on:
- at least one physical link corresponding to each selected network link and to a wiring route;
- at least one cost constraint;
- at least one system survivability constraint associated with a system separation distance;
- at least one system robustness constraint associated with a minimum functional capability for continued safe flight and landing capability, the at least one system robustness constraint associated with 1) the at least one data content relationship required to support the at least one functional capability and 2) at least one failure probability associated with the at least one network link associated with the at least one data content relationship;
- at least one objective function characterizing an overall desirability associated with each configuration solution; and
- at least one of a desired optimality level and a desired optimality threshold.

*FIG. 4B*

SYSTEM AND METHOD FOR OPTIMIZING DESIGN OF AIRCRAFT BACKPLANE SPATIAL SEPARATION

BACKGROUND

Today's commercial jets are massively complex aircraft, and their next-generation successors may be even more so, incorporating potentially thousands of sensors positioned throughout the aircraft. These sensors may detect a current altitude of the aircraft, determine its position to within meters, sense the air temperature at various points along the fuselage, or simply notice that a door has not been properly closed. Each sensor feeds information through a network of backplanes and buses to central processors of the aircraft, which process and relay the collected data to the pilot and crew, or to components of the aircraft which display or act on the received data. Sensor data circulates through the aircraft via a similarly complex network of ports, hubs, and processors linked together.

Such a network architecture is similarly complex in nature and is designed with multidimensional, intersecting priorities in mind, e.g., the precise positions of sensors and devices, the need for redundant systems, and the cost (and even the weight) of the wiring required to connect them. Further complicating the design of network architecture is the need for survivable, spatially separated design. For example, federal regulations require that aircraft systems necessary for continued safe flight and landing must be spatially separated by sufficient distance to shield the system architecture from, e.g., a bomb blast, rapid decompression, or other like event resulting in catastrophic localized damage to the airframe of the aircraft.

SUMMARY

In one aspect, embodiments of the inventive concepts disclosed herein are directed to a method for designing an optimal architecture for backplane and field bus routing. The method may include enumerating the universe of possible valid locations for each required onboard sensor configured to collect critical data. The method may include determining the required data content for each avionics module or hosted application executing on the aircraft computing centers linked to the onboard sensors via network paths and configured to receive (via the network paths) critical digital data based on the collected sensor data. The method may include generating a universe of potential valid remote data concentrator (RDC) configurations including a valid location for one or more RDCs configured to generate the digital data based on the raw collected sensor data. The method may include generating a universe of potential switch configurations, each switch (either a field bus connectable to an onboard sensor or RDC via network path, or a backplane bus connectable to the computing center or RDC via network link) corresponding to a valid switch location. The method may include generating, via an optimization engine, a solution space of valid configuration solutions based on the potential sensor locations, data content requirements, RDC configurations, and switch configurations; each configuration solution corresponds to a valid set of selected sensor locations, RDC configurations, switch configurations, and network links from each sensor to the computing center. The method may include identifying, via the optimization engine, at least one optimal configuration solution from within the solution space based on connectivity constraints (e.g., at least one physical link or wiring route for each network link), system survivability constraints associated with a minimum distance between redundant systems, system robustness constraints associated with specified minimum probability of continued safe flight and landing, and the overall desirability of the configuration solution based on the selected objective function, such as minimal cost and a desired level of optimality.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 4A and 4B are process flow diagrams illustrating an exemplary embodiment of a method for designing an optimal architecture for backplane and field bus routing according to the inventive concepts disclosed herein.

DETAILED DESCRIPTION OF EXEMPLARY EMBODIMENTS

Figure 1:
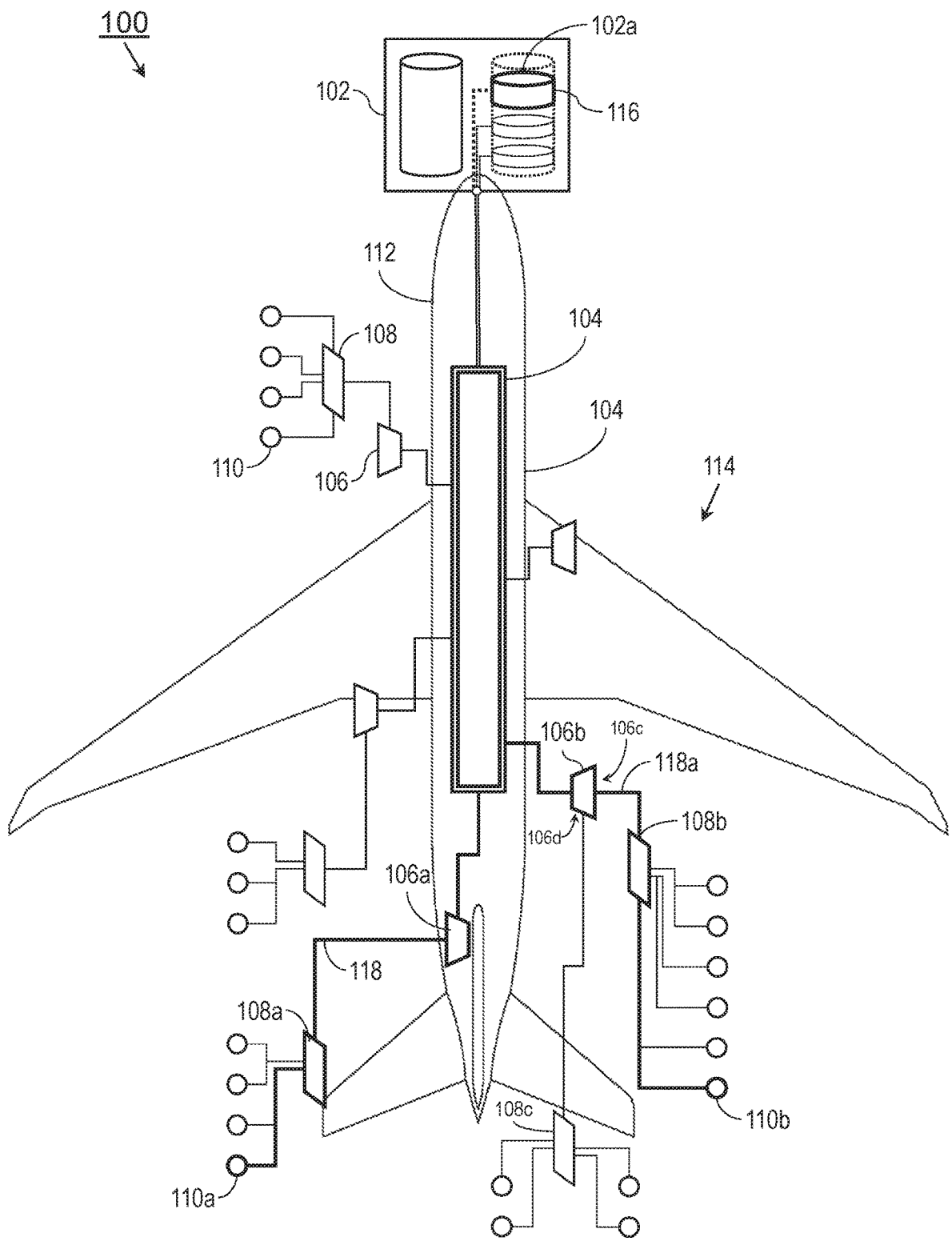
FIG. 1 is a diagrammatic illustration of an exemplary embodiment of an integrated modular architecture according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for optimizing the design of an integrated modular architecture (IMA), in particular the field bus and backplane routing thereof, via an optimization engine to determine an optimal architecture that satisfies a variety of cost constraints as well as system survivability constraints. In particular, the optimization engine can be used to determine an optimal architecture that routes wiring and cabling so as to preserve critical data flow, and maintain safe flight and landing capabilities, despite significant damage to the airframe of the aircraft.

FIG. 1—Architecture Components

Referring to FIG. 1, an exemplary embodiment of an network architecture 100 includes a computing center 102, backplane bus 104, remote data concentrators 106 (RDC), field buses 108, and sensors 110 arranged throughout the fuselage 112 of an aircraft 114. Sensors 110 may additionally be placed throughout the wing assemblies of the aircraft 114, as well as in the doors (e.g., in the case of an open-door or unsecured-door sensor). For example, the aircraft 114 may be a large commercial jet incorporating a computing cabinet housing one or more high-integrity multicore processors (102a) (e.g., processing cores, processing units); each multicore processor 102a may host one or more avionics modules 116 or hosted applications executing at one or more particular locations (e.g., within a particular processing core or a logical partition of a processing core) on the multicore processor. The computing center 102 may be centrally located, e.g., as a cabinet or left/right paired cabinets wherein the multicore processors 102a (e.g., computing blades) are housed. In some embodiments, the network architecture 100 may provide for decentralization of computing centers 102, whereby, e.g., the locations of multicore processors 102a may be elsewhere in the fuselage 112, or the locations of multicore processors may be selected according to a particular constraint or objective function. Each avionics module 116 may monitor or control a particular avionics function according to a particular data content relationship, the data content relationship based on the data content requirements of each avionics module 116; e.g., each avionics module 116 requires a particular combination of data inputs to execute. For example, a relative positioning module executing on the multicore processors 102a may determine a relative position of the aircraft 114 (e.g., relative to a georeferenced absolute position or to some prior position of the aircraft 114), and in order to do so the relative positioning module receives current and updated position information from sensors 110 throughout the aircraft 114 (e.g., inertial measurement units (IMU), pitot-static systems, barometric altimeters). Other sensors (110) may determine anything from the outside air temperature to the presence of a fire, to whether a particular door or compartment is open or closed. Each sensor 110 may be connected to the computing center 102, and feed data thereto, via a defined network path (118) which may include one or more switches (e.g., backplane buses 104 or field buses 108) through which the data is routed and an RDC 106. RDCs 106 may serve as high-speed general-use hubs (e.g., Ethernet, fiber-optic, ARINC 629), digitizing or otherwise processing raw sensor data into digital values compatible with the computing center 102. For example, the defined network path 118 may carry sensor data from an onboard sensor 110a to a local field bus (108a), to a designated RDC (106a) for processing, and through a backplane bus 104 to an avionics module 116 executing on a multicore processor 102a of the computing center 102; the field bus 108a, RDC 106a, and backplane bus 104 may be connected by wiring, fiber-optic cables, coaxial cables, or other types of physical link. The computing center 102 may display data to the pilot or crew (e.g., via cockpit-mounted display units) or, based on the received data, carry out various avionics functions via actuated devices connected to the computing center (e.g., the aircraft autopilot may automatically manipulate a control surface in response to a detected minor loss of altitude).

Sensor networks may include redundant sensors (110b) which may serve as a backup system or enhance the integrity and availability of sensor data or serve as a backup system. For example, a relative positioning module may receive the same sensor data (or a digitized version thereof) from primary sensors 110a as well as redundant sensors 110b. The redundant sensor data collected by the redundant sensors 110b may reinforce the primary sensor data collected by the primary sensors 110a (e.g., data collected by the two sources may be identical) or provide an integrity check on the primary sensor data (e.g., if two primary sensors 110a provide contradictory or dissimilar readings, the redundant sensor data may be used to "vote out" the outlying data point and determine whether the outlying primary sensor 110a is faulty). The redundant sensor 110b may be connected to the computing center 102 via a network link (118a) separate and different from that of the primary sensor 110a, incorporating distinct field buses (108b) or RDCs (106b).

An exemplary embodiment of a method for designing an optimal IMA for backplane and field bus routing according to the inventive concepts disclosed herein may improve upon conventional design approaches which employ multiple engineers to devise heuristic rules to reduce the size of the solution space, e.g., the universe of all valid potential architecture configurations. The aircraft 114 may incorporate potentially thousands of sensors 110, hundreds of switches (field buses 108, RDCs 106, backplane buses 104), and several tons of wiring and cabling to connect them. Consequently, the solution space including even a fraction of all possible architecture configurations (excluding extreme cases, e.g., one field bus 108 for every individual sensor 110 or, inversely, connecting each sensor 110 to a single backplane bus 104) may be massive. However, heuristically reducing the size of the solution space may incorporate sequential rather than multidimensional decision making, closing off potentially favorable or even optimal configuration solutions.

Rather, methods according to the inventive concepts disclosed herein may incorporate an optimization engine to analyze the full solution space across multiple dimensions at once depending on system constraints. For example, depending on the aircraft 114 design or purpose, the precise number of sensors 110 may vary widely; similarly, the possible locations for each sensor 110 may also vary. Additionally, the quantity of field buses 108, backplane buses 104, and RDCs 106 may vary, as well as the type and length of the physical links connecting these components to one another. The placement of a particular sensor 110 may affect the length of wiring/cabling required to connect the sensor 110 to the computing center 102, which wiring/cabling length may be associated with a wiring cost and weight that may in turn affect the overall cost associated with the architecture as well as the overall weight of the aircraft 114, which may further influence fuel economy, maneuverability, or long-term operating costs. Increasing the quantity of backplane buses 104, RDCs 106, and field buses 108 may enhance connectivity and data rates, but may increase component costs as well as architecture complexity (more switches and RDCs may require more wiring to interconnect, which may in turn affect available space aboard the aircraft 114 as well as system separation concerns.

Figure 2:
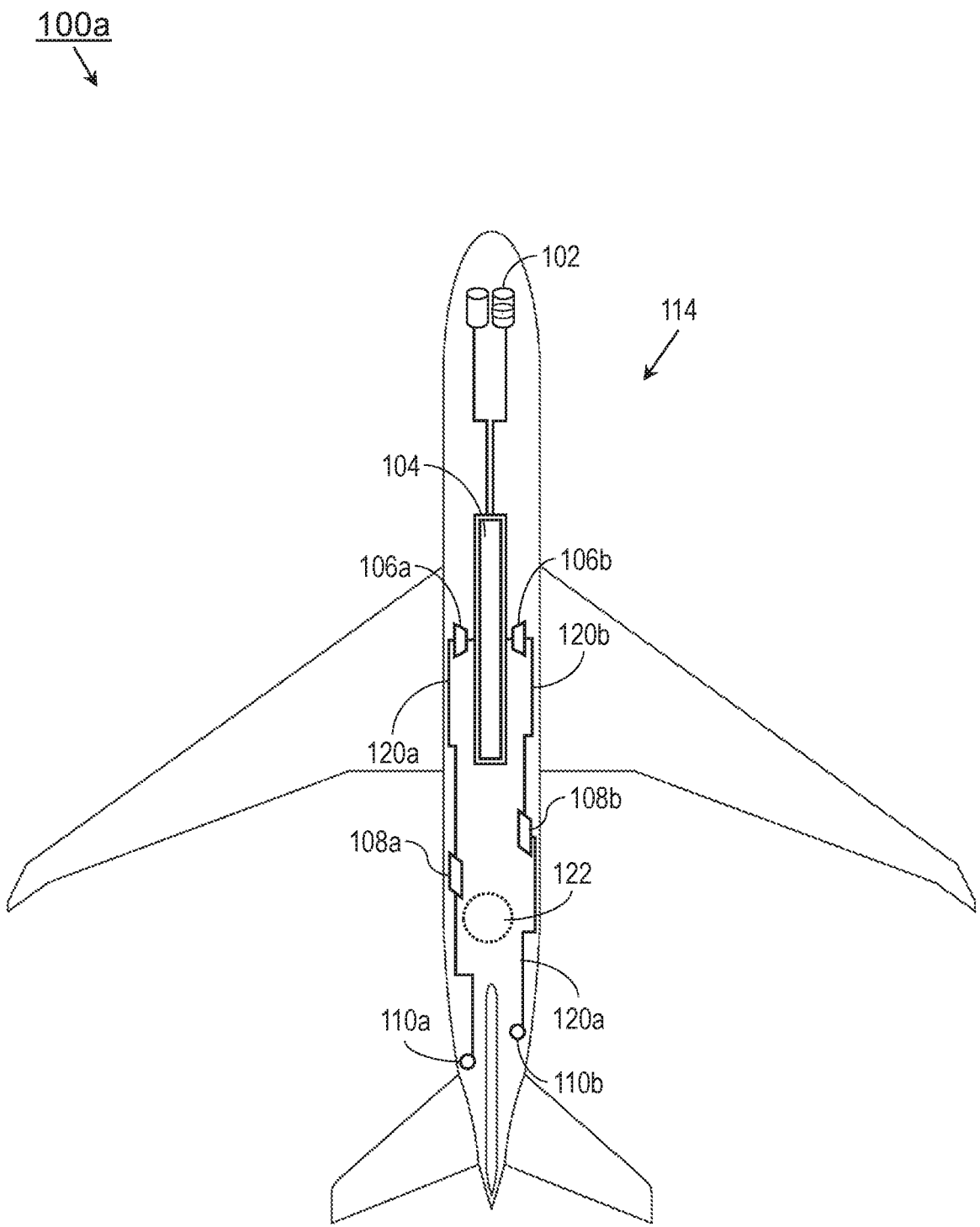
FIG. 2 is a diagrammatic illustration of a configuration solution to the integrated modular architecture of FIG. 1.

FIG. 2—Physical Links and Separation Distance

Referring to FIG. 2, a network architecture 100a corresponding to the aircraft 114 may be implemented and may operate similarly to the network architecture 100 of FIG. 1, except that the network architecture 100a may incorporate physical links 120a-b corresponding to the network links 118, 118a shown in FIG. 1. The method for designing an optimal network architecture for backplane and field bus routing according to the inventive concepts disclosed herein may first define the universe of possible valid sensor locations (for each aircraft sensor 110), RDC configurations (quantities, positions and connectivity of RDCs 106), switch configurations (quantities, positions and connectivity of backplane buses 104 and field buses 108), and the defined network links 118 connecting each aircraft sensor 110a-b to the computing center 102. From within this universe, the method may generate a solution space of all valid configuration solutions, identifying within the solution space optimal configuration solutions by applying further system constraints. For example, a desirable or optimal configuration solution may provide for the mapping of at least one physical link 120a-b (e.g., a wiring or cabling route) to every defined network link 118 within the configuration solution. Further, an optimal configuration solution may provide for sufficient separation distance between a primary system and a redundant system, such that the data content relationships associated with critical systems (e.g., the data content requirements of critical avionics modules or hosted applications executing on the computing center 102, and required to maintain continuous safe flight and landing) are maintained under conditions where the airframe of the aircraft 114 has sustained significant structural damage, e.g., from a bomb detonation or similar destructive event. For example, the physical link 120a connecting the primary sensor 110a to the computing center 102 (e.g., via field bus 108a, RDC 106a, and backplane bus 104) may be physically separated from the physical link 120b connecting the redundant sensor 110b to the computing center 102 (e.g., via field bus 108b, RDC 106b, and backplane bus 104) such that a sphere 122 of predetermined diameter may be fully passed between the two physical links 120a-b (e.g., the aircraft 114 may incur a corresponding amount of structural damage or loss without interruption of data flow to the computing center 102). For example, federal regulations provide for a minimum separation distance between redundant systems defined by a sphere of diameter $$D = 2\sqrt{\frac{H_0}{\pi}} = 2\sqrt{\frac{PA_3}{\pi}}$$

where D is the diameter in feet (generally not exceeding 5.05 ft), $H_0$ the size (in square feet) of a hole or opening in any compartment of the aircraft 114 leading to rapid decompression, which any component of system of the aircraft 114 essential to safe flight and landing must be designed to withstand. In addition, the specification of sets of critical data items associated with minimum functional capabilities for achieving continued safe flight and landing, the network paths traversed by these data items from sensors all the way to computing centers, the independence of such paths, and known failure probabilities of a) the physical paths by which these network paths are realized and b) the physical components along these physical paths, can enable the calculation of a lower bound on the probability of continued safe flight and landing.

Figure 3:
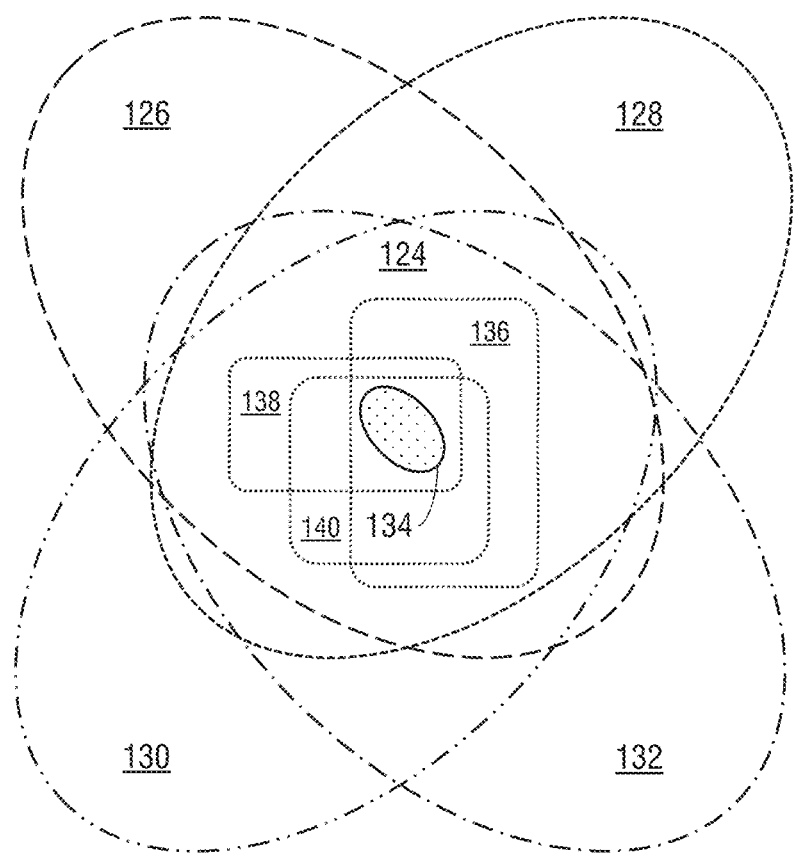
FIG. 3 is a diagrammatic illustration of an exemplary embodiment of a solution space and optimal configuration solutions according to the inventive concepts disclosed herein.

FIG. 3—Solution Space and the Optimization Process

Referring now to FIG. 3, a method for optimizing the design of the network architectures 100, 100a of FIGS. 1 and 2 may determine a solution space 124 of valid potential configurations of the network architecture 100. For example, as described above, processors may determine a first universe of potential solutions having sensor locations (126) incorporating valid locations for each of a defined number of aircraft sensors (110, FIG. 1) of the network architecture 100. The processors may determine a second universe (128) of solutions having data content relationships, incorporating (and minimizing) the input data requirements of each avionics module or hosted application executing on the computing center (102, FIG. 1). The processors may generate a third universe (130) of potential solutions having RDC configurations, where each RDC configuration incorporates a defined number of RDCs (106, FIG. 1), each RDC having a particular number of degrees of freedom (e.g., Information Fault Zone (IFZ)) and configured to digitize raw sensor data received from the aircraft sensors 110. Referring back to FIG. 1, each RDC 106b may have a number of IFZ (106c-d). Each IFZ 106c-d supports connection to a given number of field buses (108b-c). For example, when two field buses 108b-c are connected to different IFZs (106c-d) on an RDC 106b, the RDC 106b will ensure the source authentication to the integrity of the RDC rather than to the internal IFZ integrity. This ensures there is no cross contamination of data between the inbound field buses 108b-c. The isolation between two field buses 108b-c connected to different IFZ (106c-d) on an RDC 106 ensures the functional redundancy to the two sources is preserved through the RDC. The quantity of IFZ (106c-d) configured on each RDC 106b is a degree of freedom contributing to the universe of solutions.

The quantity of IFZ (106c-d) on a given RDC 106b is a cost driver for the RDC. On the other hand, the larger the number of IFZ on each RDC 106b, the larger the solution space 124 for connected field buses 108b-c carrying redundant data. Therefore the selection of the quantity of IFZ (106c-d) on each RDC 106 is an important design consideration. Referring back to FIG. 3, the processors may generate a fourth universe (132) of potential solutions with switch configurations, where each switch configuration incorporates a particular number of backplane buses (104, FIG. 1) and field buses (108, FIG. 1), and each backplane bus and field bus has a valid location aboard the aircraft. The solution space 124 may be based on an intersection of these four universes 126, 128, 130, 132, wherein the requirements of each individual universe are met by any configuration solution within the solution space 124.

Optimal configuration solutions (134) within the solution space 124 may be identified by applying further refinements to the solution space via an optimization engine. Conventional approaches to IMA design may provide for the development of heuristic rules by multiple engineers, and the sequential application of said heuristic rules to reduce the size of the solution space (124) to a set of configuration solutions that align with each heuristic rule. However, such a sequential decision-making approach may inadvertently eliminate optimal solutions. By contrast, the optimization engine may analyze the solution space across multiple dimensions, applying constraints across all component universes 126, 128, 130, 132 in parallel, rather than in sequence. For example, the optimization engine may identify the subset (136) of configuration solutions incorporating full connectivity, e.g., ensuring at least one physical link (120, FIG. 2) for each defined network link (118, FIG. 1). In addition, the optimization engine may identify the subset (138) of configuration solutions incorporating sufficient system spatial separation to ensure continued critical data availability for safe flight and landing in the event of a bomb detonation of predetermined size. Further, the optimization engine may identify the subset (140) of configuration solutions meeting a predetermined cost objective, e.g., minimizing overall costs, costs associated with the number of system components, or costs associated with the amount, unit cost, or weight of the wiring or cabling required to connect all system components as provided for by the configuration solution. The intersection (134) of these optimization subsets 136, 138, 140 may include all configuration solutions that satisfy all necessary constraints to a predetermined degree of optimality. For example, the intersection 134 of optimal configuration solutions may be determined to 99% optimality, e.g., any optimal configuration solution within the intersection 134 is assured of being no more than 1% less desirable as a solution, with respect to the optimality criterion, and subject to the applicable constraints), than any configuration solution within the solution space 124 generally. Finally, the intersection 134 of optimal configuration solutions may be defined by the overall desirability of each configuration solution according to the selected objective function. For example, what makes a given configuration solution "optimal" according to the aforementioned constraints may itself vary as various resources become more or less available.

Figure 4A:
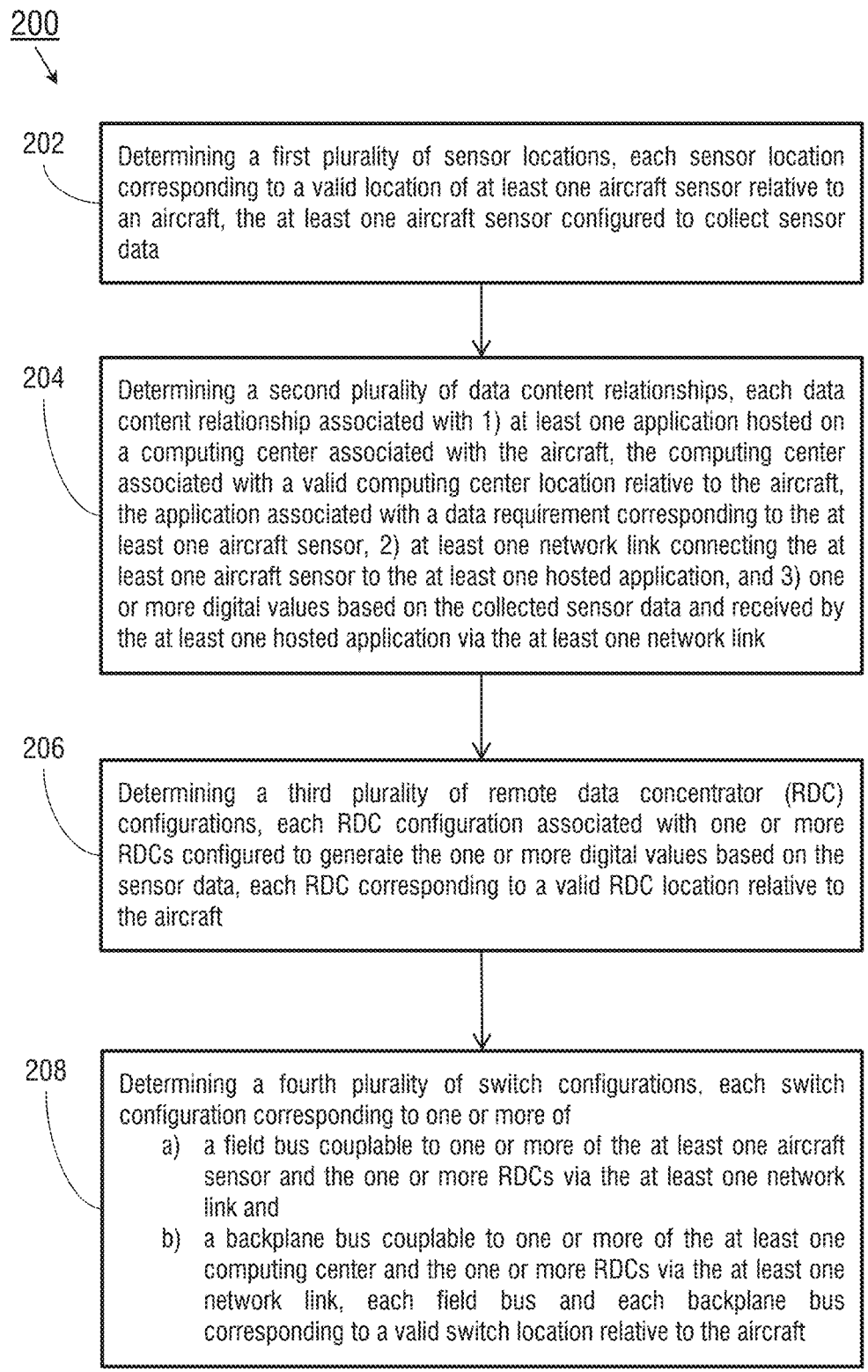

FIGS. 4A/B—Method

Referring now to FIGS. 4A and 4B, an exemplary embodiment of a method 200 for designing an optimal architecture for backplane and field bus routing according to the inventive concepts disclosed herein may include one or more of the following steps.

Referring in particular to FIG. 4A, at a step 202, one or more processors determine a first universe of potential sensor locations, each sensor location corresponding to a valid location of an aircraft sensor configured to collect sensor data.

At a step 204, the processors determine a second universe of data content relationships, each data content relationship based on an avionics module or hosted application executing on a computing center of the aircraft (and corresponding to a valid location of the computing center relative to the aircraft), the hosted application associated with a data content requirement based on the aircraft sensor supplying the required data and the network links by which the required data is supplied, and the digitized values (based on the required sensor data collected by the required aircraft sensors received via the required network links connecting the aircraft sensors to the computing center.

At a step 206, the processors determine a third universe of RDC configurations, wherein each RDC configuration is based on a quantity of RDCs configured to generate the digitized values based on the collected sensor data, and wherein each RDC corresponds to a valid potential location aboard the aircraft.

At a step 208, the processors determine a fourth universe of switch configurations, wherein each switch configuration is based on a quantity of backplane buses (connected to the computing center or the RDCs via network link) and field buses (connected to the aircraft sensors or RDCs via network link), each backplane bus or field bus corresponding to a valid potential location aboard the aircraft.

Referring now to FIG. 4B, at a step 210, an optimization engine determine a solution space based on the four determined universes, the solution space comprising valid configuration solutions for the aircraft, wherein each configuration solution incorporates selected sensor locations from the first universe, selected RDC configurations from the third universe, selected switch configurations from the fourth universe, and selected network links connecting the aircraft sensors to the computing centers via the selected RDCs and switches according to the second universe of applicable data content relationships. For example, selected sensor locations may include primary and redundant sensors in different locations, with separate network links connecting the primary and redundant sensors to the computing center. The selected network links may reflect minimizing the necessary data content at each computing center or processing core.

At a step 212, the optimization engine identifies within the solution space optimal configuration solutions based on at least a) a physical link corresponding to each network link of the configuration solution, b) system survivability constraints associated with a separation distance between primary and redundant systems, c) system robustness constraints associated with specified minimum probability of continued safe flight and landing (and the data content relationships (e.g., the hosted applications required to support safe flight and landing capability, the aircraft sensors supplying the required data to the required hosted applications, and failure probabilities associated with the network links by which the required data reaches the hosted applications as well as the network components (field buses, RDCs, backplane buses) through which the required data passes), d) a selected optimality criterion or objective function, and e) a predetermined optimality level. For example, if the desired optimality level is 99 percent, all optimal configuration solutions will not only meet any applied constraints, but do so to within 1 percent of the desirability (i.e. the value of the objective function) of solutions within the space of optimal configuration solutions. Possible objective functions may include the total costs associated with the quantity of backplane buses, field buses, and/or RDCs associated with each configuration solution, the degrees of freedom associated with each selected RDC, the quantity of wiring or cabling required to map a physical link to each network link of the configuration solution, or the weight costs associated with the component quantities and the wiring or cabling required to connect them. System survivability constraints may be based on sufficient separation distance between primary and redundant systems (e.g., the physical links corresponding to the network links connecting primary and redundant sensor sources to the computing center) such that a sphere of predetermined size may be passed between the primary and redundant systems.

As will be appreciated from the above, systems and methods according to embodiments of the inventive concepts disclosed herein may generate optimal architectures for aircraft sensor, bus, and switch positioning more efficiently than conventional heuristic approaches. By using the optimization engine, backplanes and field buses may not only be selected and positioned to minimize overall costs, but physical link routing (wires and cables) may be planned to as to preserve system survivability and spatial separation concerns.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A method for aircraft backplane configuration design, the method comprising:
    determining a plurality of sensor locations, each sensor location corresponding to a valid location of at least one aircraft sensor relative to an aircraft, the at least one aircraft sensor configured to collect sensor data;
    determining a plurality of data content relationships, each data content relationship associated with 1) at least one application hosted on a computing center associated with the aircraft, the computing center associated with a valid computing center location relative to the aircraft, the application associated with a data requirement corresponding to the at least one aircraft sensor, 2) at least one network link connecting the at least one aircraft sensor to the at least one hosted application, and
    3) one or more digital values based on the collected sensor data and received by the at least one hosted application via the at least one network link;
    determining a plurality of remote data concentrator (RDC) configurations, each RDC configuration associated with one or more RDCs configured to generate the one or more digital values based on the sensor data, each RDC corresponding to a valid RDC location relative to the aircraft;
    determining a plurality of switch configurations, each switch configuration corresponding to one or more of a) a field bus couplable to one or more of the at least one aircraft sensor and the one or more RDCs via the at least one network link and b) a backplane bus couplable to one or more of the at least one computing center and the one or more RDCs via the at least one network link, each field bus and each backplane bus corresponding to a valid switch location relative to the aircraft;
    determining, via at least one optimization engine, at least one solution space based on the plurality of sensor locations, the plurality of data content relationships, the plurality of RDC configurations, and the plurality of switch configurations, the at least one solution space associated with a plurality of configuration solutions corresponding to the aircraft, each configuration solution comprising a plurality of component universes including:
    one or more selected sensor locations of the plurality of sensor locations;
    one or more selected RDC configurations of the plurality of RDC configurations;
    one or more selected switch configurations of the plurality of switch configurations, and
    one or more selected network links of the plurality of network links, each network link connecting the at least one aircraft sensor to the at least one computing center; and
    determining, via the at least one optimization engine, one or more optimal configuration solutions associated with a desired degree of optimality within the plurality of configuration solutions based on parallel application of a system survivability constraint associated with at least one system separation distance between a primary system and a corresponding redundant system and one or more additional constraints to the plurality of component universes, the additional constraints selected from:
    a connectivity constraint;
    a cost constraint;
    a system robustness constraint associated with a minimum functional capability for continued safe flight and landing capability, the at least one system robustness constraint associated with 1) the at least one data content relationship required to support the functional capability and 2) at least one failure probability associated with the network link associated with the data content relationship;
    and
    at least one objective function characterizing an overall desirability associated with each configuration solution.

2. The method of claim 1, wherein:
    the one or more selected sensor locations comprise:
    at least one primary sensor associated with a plurality of valid primary sensor locations;
    and
    at least one redundant sensor configured to duplicate the at least one primary sensor, the at least one redundant sensor associated with a plurality of valid redundant sensor locations;

the one or more selected network links comprise:

at least one primary network link connecting the at least one primary sensor to the at least one computing center;

and at least one redundant network link connecting the at least one redundant sensor to the at least one computing center;

and the at least one system survivability constraint is associated with a system separation distance between at least one first physical link corresponding to the primary network link and at least one second physical link corresponding to the redundant network link.

3. The method of claim 1, wherein the at least one cost constraint comprises at least one of:

a switch cost factor associated with the one or more selected switch configurations;

an RDC cost factor associated with the one or more selected RDC configurations;

a wiring cost factor associated with the one or more selected RDC configurations;

and a weight cost factor associated with at least one of the one or more selected RDC configurations, the one or more selected switch configurations, and the at least one connectivity constraint.

4. The method of claim 3, wherein:

the at least one switch cost factor is associated with a first quantity of one or more of the field bus and the backplane bus corresponding to the one or more selected switch configurations;

and the at least one RDC cost factor is associated with a second quantity of the one or more RDCs corresponding to the one or more selected RDC configurations.

5. The method of claim 3, wherein:

the at least one RDC cost factor is associated with one or more degrees of freedom associated with the one or more RDCs corresponding to the one or more selected RDC configurations.

* * * * *